(12) United States Patent
Chase et al.

(10) Patent No.: US 7,240,115 B2
(45) Date of Patent: Jul. 3, 2007

(54) PROGRAMMATICALLY ALLOCATING MEMORY AMONG COMPETING SERVICES IN A DISTRIBUTED COMPUTING ENVIRONMENT

(75) Inventors: Jeffrey S. Chase, Durham, NC (US); Ronald P. Doyle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 862 days.

(21) Appl. No.: 10/315,376

(22) Filed: Dec. 10, 2002

(65) Prior Publication Data

US 2004/0111514 A1    Jun. 10, 2004

(51) Int. Cl.
G06F 15/173    (2006.01)

(52) U.S. Cl. .................. 709/226; 709/225; 718/100
(58) Field of Classification Search .............. 711/170, 711/173; 709/225, 226, 213, 229; 718/100, 718/104, 105
See application file for complete search history.

(56) References Cited

U.S. PATENT DOCUMENTS

| | | | | |
|---|---|---|---|---|
| 6,857,020 B1* | 2/2005 | Chaar et al. | ................ | 709/226 |
| 2003/0005024 A1* | 1/2003 | Grumann | .................... | 709/102 |
| 2003/0061263 A1* | 3/2003 | Riddle | ........................ | 709/104 |
| 2004/0030777 A1* | 2/2004 | Reedy et al. | ............... | 709/224 |
| 2004/0073763 A1* | 4/2004 | Dageville et al. | ........... | 711/170 |

OTHER PUBLICATIONS

Glassman, Steven, Apr. 21, 1997, "Limits to caching", from A caching Relay for the World Wide Web, http://research.compaq.com/SRC/personal/steveg/CachingTheWeb/section3_6.html.*
Menasce, Daniel, 1994, Capacity Planning and Performance Modeling From Mainframes to Client-Server Systems, p. 163.*
Glassman, Steven, "Limits to caching", from *A Caching Relay for the World Wide Web* (Apr. 21, 1997), [web-published article], Nov. 4, 2002 <http://research.compaq.com/SRC/personal/steveg/CachingTheWeb/section3_6.html>.
Li, Wentian, *Zipf's Law*, [web-published article],Nov. 4, 2002 <http://linkage.rockefeller.edu/wli/zipf/>.
Nielsen, Jakob, *Do Websites Have Increasing Returns?* (Apr. 15, 1997), [web-published article], Nov. 4, 2002 <http://www.useit.com/alertbox/9704b.html>.
Nielsen, Jakob, *Zipf Curves and Website Popularity* (Apr. 1997), [web-published article], Nov. 4, 2002 <http://www.useit.com/alertbox/zipf.html>.

* cited by examiner

*Primary Examiner*—Zarni Maung
*Assistant Examiner*—Alan Chou
(74) *Attorney, Agent, or Firm*—Marcia L. Dauhet; Jeanine S. Ray-Yarletts

(57) ABSTRACT

Techniques are disclosed for programmatically allocating memory among competing services in a distributed computing environment. Characteristics of web request streams and formulas for cache hit rates and client response times are used to create an objective function for memory allocation, such that maximum benefit can be realized from the memory allocations. When a particular service is allocated more memory, it can store more of its objects in cache, which improves client response time. Optionally, information from service level agreements may be used as input to the memory allocation computations.

33 Claims, 3 Drawing Sheets

FIG. 3A $$H = \frac{\int_1^M 1 - X^\alpha \, dx}{\int_1^T 1 - X^\alpha \, dx}$$

FIG. 3B $$H = \frac{[1 - (M  (1 - \alpha))]}{[1 - (T  (1 - \alpha))]}$$

FIG. 3C $$R = R_C + (1 - H) * R_S$$

PROGRAMMATICALLY ALLOCATING MEMORY AMONG COMPETING SERVICES IN A DISTRIBUTED COMPUTING ENVIRONMENT

BACKGROUND OF THE INVENTION

1. Field of the Invention

The present invention relates to distributed computing networks, and deals more particularly with programmatic techniques for allocating memory among competing services in a distributed computing environment such that maximum benefit can be realized from the memory allocations (e.g., to improve client response time).

2. Description of the Related Art

The popularity of distributed computing networks and network computing has increased tremendously in recent years, due in large part to growing business and consumer use of the public Internet and the subset thereof known as the "World Wide Web" (or simply "Web"). Other types of distributed computing networks, such as corporate intranets and extranets, are also increasingly popular. As solutions providers focus on delivering improved Web-based computing, many of the solutions which are developed are adaptable to other distributed computing environments. Thus, references herein to the Internet and Web are for purposes of illustration and not of limitation.

Whereas the early Internet served primarily as a distributed file system in which human users could request delivery of already-generated static documents, the trend in recent years has been to add more and more dynamic and personalized aspects into the content that is served to requesters. However, many dynamically-generated documents also include static content, such as forms, graphic images, sound files, and other types of embedded objects. (Thus, discussions herein are primarily in terms of already-generated static content, but apply equivalently to static content which is incorporated into dynamically-generated documents or other types of dynamically-generated content.)

The number of objects involved in servicing a content request may range from a single stored object to a relatively large number of objects (often, on the order of tens of objects). (The terms "stored object" and "object" are used interchangeably herein to refer to an object or file which is stored on a storage medium—or which may, in some cases, be distributed across more than one storage medium. It should be noted that references herein to objects are not to be construed as limiting the present invention to the field of object-oriented programming. Furthermore, the term "content" as used herein is intended to be synonymous with one or more objects or files unless the reference context indicates otherwise.)

While some content requests are generated programmatically, many content requests have a human user waiting for a response. Returning responses quickly and efficiently can therefore be critical to user satisfaction and to the overall success of a Web site.

In a Web hosting or service provider environment where a number of services are hosted, the hosted services are in competition for the scarce (i.e., limited) resources that are available, such as central processing unit ("CPU") time, storage resources, and memory. It is desirable to tune the system so that each hosted service has an appropriate amount of access to those resources, enabling the collection of services as a whole to offer optimal response time to their users. When allocating memory amongst the services to use for cache space, it is therefore desirable to determine which service(s) will benefit most from this resource allocation.

As is well known in the art, caching reduces the number of requests that reach the Web servers, thereby improving response time (and also reducing processing load on devices upstream from the cache). When content cannot be served from cache, the content requests come to a Web server. This is commonly referred to as a "cache miss", whereas finding content that can be served from cache is referred to as a "cache hit".

A "cache hit ratio" is defined as the number of references to objects in the cache, divided by the total number of references for all objects. (For purposes of the present invention, cache hit ratios are preferably expressed in terms of each particular service offered by the Web hosting environment.) Typical cache replacement algorithms seek to maximize the cache hit ratio (with perhaps some caveats for considering the cost of replacing some cached objects, and balancing this cost against the improvements in the cache hit ratio).

Response time is longer for objects that have a cache miss, due to the added cost of retrieving the object from storage. If the cache hit ratio for a particular service "S" is low (i.e., there are a large number of cache misses), relative to the other hosted services, it may be desirable to allocate more memory for caching the objects of service S, to thereby reduce the response time for servicing S's client requests.

Accordingly, what is needed are improved techniques for allocating memory for cache storage space among competing services in a distributed computing environment.

SUMMARY OF THE INVENTION

An object of the present invention is to provide novel techniques for allocating memory for cache storage space among competing services in a distributed computing environment.

Another object of the present invention is to programmatically allocate memory among a plurality of services, based on service-specific behavior characteristics.

Yet another object of the present invention is to incorporate service level agreement commitments into the memory allocation process.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for allocating memory among competing services in a distributed computing environment. In one aspect, additional memory is allocated. In preferred embodiments, this technique comprises: determining an average per-request client response time formula for each particular one of the plurality of competing services; computing a derivative of each of the average per-request client response time formulas; computing a slope of a line for each computed derivative; and selecting one of the competing services for allocation of additional memory, based on the computed slope for that competing service. The selected one of the competing services is preferably that one for which the computed slope has a largest value Preferably, the average per-request client response time formula is determined by: determining an average CPU time for processing requests of the particular service; determining an average storage response time for the requests of the particular service; determining an estimated cache hit ratio for the particular service; computing an estimated cache miss ratio for the particular service as (1−the estimated cache hit ratio for the particular service); multiplying the estimated cache miss ratio for the particular service by the average storage response time for the particular service, yielding a response time component for the particular service; and adding the average CPU time for the particular service and the response time component for the particular service, thereby obtaining the average per-request client response time formula for the particular service. In preferred embodiments, the estimated cache hit ratio is based upon a Zipf-like distribution function of the particular service.

The technique may further comprise weighting the computed slopes to reflect response time commitments from one or more service level agreements pertaining to the particular service for which that slope was computed.

In another aspect, already-allocated memory is reallocated. In preferred embodiments, this technique comprises: determining an average per-request client response time formula for each particular one of the plurality of competing services; computing a derivative of each of the average per-request client response time formulas; computing a slope of a line for each computed derivative; selecting a first one of the competing services for allocation of additional memory; selecting a second one of the competing services for de-allocation of allocated memory; and de-allocating a portion of the allocated memory from the second competing service and reallocating that portion to the first competing service.

Preferably, the first competing service is that one of the competing services for which the computed slope has a largest value and the second competing service is that one of the competing services for which the computed slope has a smallest value.

The reallocating may be triggered by, for example, an increase in an arrival rate of client requests to the first competing service.

In this aspect, determining an average per-request client response time formula is preferably analogous to the approach of the first aspect. Similarly, the estimated cache hit ratio is preferably based upon a Zipf-like distribution function of the particular service, and this aspect may optionally include weighting the computed slopes to reflect response time commitments from one or more service level agreements pertaining to the particular service for which that slope was computed.

The present invention may also be used advantageously in methods of doing business, for example by providing improved systems and/or services wherein the allocation of memory is managed in an improved manner. Providers of Web hosting services may offer this improved memory allocation to their customers for a competitive edge in the marketplace. This method of doing business preferably further comprises: determining an average per-request client response time formula for each particular one of the plurality of competing services; computing a derivative of each of the average per-request client response time formulas; computing a slope of a line for each computed derivative; when additional memory is to be allocated, performing the step of selecting one of the competing services for allocation of additional memory, based on the computed slope for that competing service; and when allocated memory is to be reallocated, performing the steps of: selecting a first one of the competing services for allocation of additional memory; selecting a second one of the competing services for de-allocation of allocated memory; and de-allocating a portion of the allocated memory from the second competing service and reallocating that portion to the first competing service.

The present invention will now be described with reference to the following drawings, in which like reference numbers denote the same element throughout.

BRIEF DESCRIPTION OF THE DRAWINGS

FIGS. 3A–3C provide equations used by preferred embodiments when determining memory allocations.

DESCRIPTION OF PREFERRED EMBODIMENTS

Figure 1:
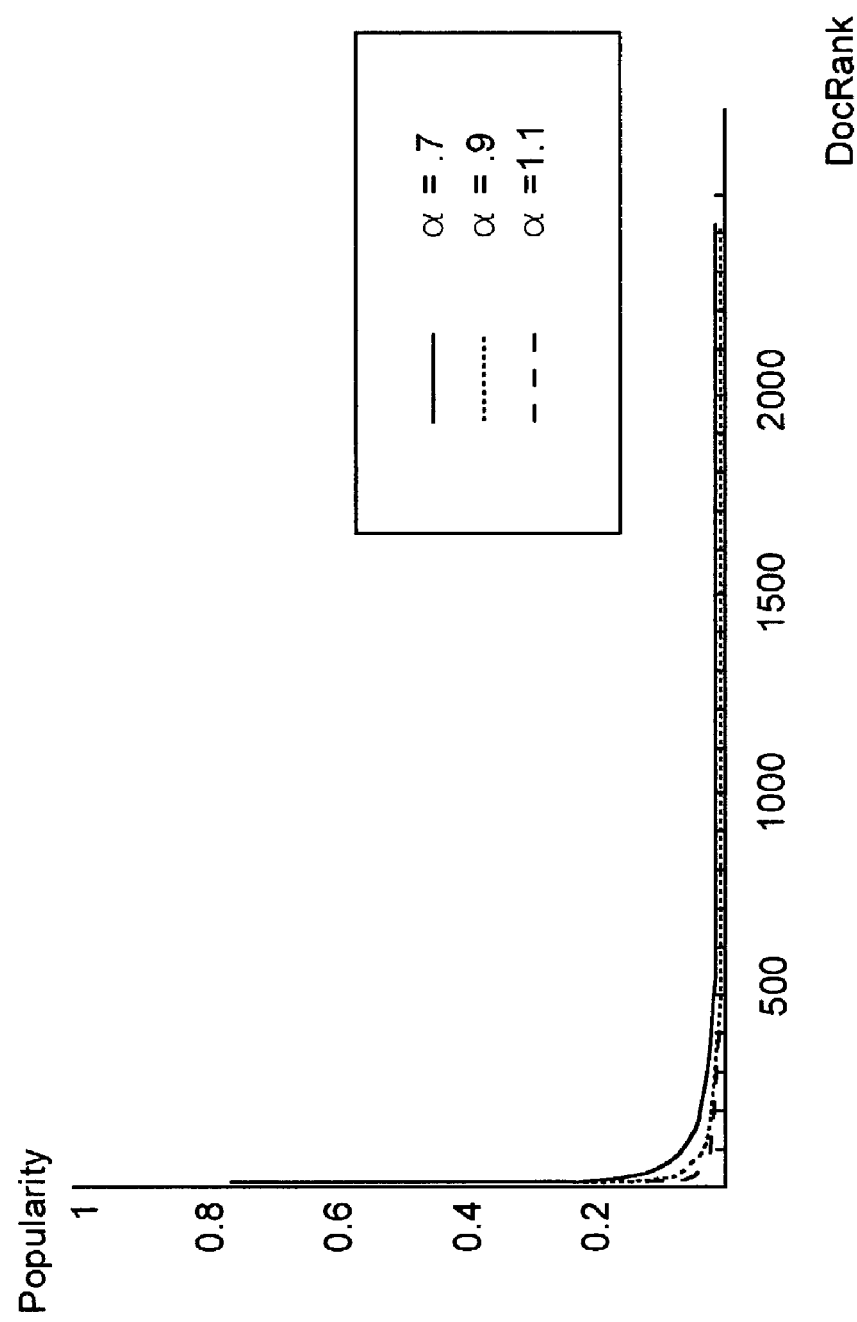
FIG. 1 provides a graph illustrating several Zipf-like popularity distribution curves, for various values of a Zipf α (alpha) coefficient, according to the prior art.

The present invention provides novel techniques for autonomically allocating memory for cache storage space among competing services in a distributed computing environment. Known characteristics of Web request streams are exploited, with known (or derived) formulas for cache hit rates and client response times, to create an objective function (that is, a function that allows objectively computing values). This objective function enables maximizing the benefit of memory allocation among the competing services, where that memory will be used for caching objects of the services. In particular, the objective function is the derivative of client response time. Upon computing this derivative, the service whose response time graph has the highest slope is determined to be the service that will benefit most by adding more memory for caching objects.

The client response time is computed, according to preferred embodiments, as average CPU time per request plus average storage response time per request. (In an alternative embodiment, network response time could be considered as well, but since that parameter is not impacted by memory allocation and is not controllable by the allocation decision, it has been omitted from the formulas of the preferred embodiments.) Let "R" represent the average client response time for a particular service's requests, and let "$R_C$" represent the average CPU time per request for this service. Techniques for determining average per-request CPU time are known in the art, and do not form part of the novel concepts of the present invention. Thus, any appropriate CPU-time-estimating function may be used to compute $R_C$. (Preferably, the CPU is modeled as a basic queuing center.) The manner in which preferred embodiments compute the average storage response time will now be described.

Assuming a distribution where client requests arrive at a rate λ (lambda), some of these requests will be serviced directly from cache. (The value of λ is preferably determined by evaluating the request stream of a service over a period of time.) Those not serviced from cache will arrive at the storage processing system at a rate "$\lambda_S$". Let "$R_S$" denote the storage response time for processing a request. Note that if a particular request is for an object that is stored in cache, then the value of $R_S$ is zero (that is, there is no need to access storage). Otherwise, for those objects not stored in cache, the cost of retrieving that object from storage upon a cache miss is expressed by the formula $R_S=[D_S/(1-\lambda_S D_S)]$, where "$D_S$" is the average per-requ time from storage.

To compute the overall average storage response time for a particular service, it is necessary to determine how many of that service's objects will be cached (or, conversely, how many of the objects will encounter a cache miss, for which storage retrieval will be required). The novel techniques with which this is accomplished by preferred embodiments will now be described.

It is a known characteristic, according to various studies, that Web request streams (i.e., the stream of requests transmitted by clients) generally follow a very distinct statistical distribution pattern known as a "Zipf distribution" (or a "Zipf-like" distribution). A Zipf distribution is a particular type of distribution pattern wherein a double-logarithmic plotting of the distribution (that is, a plotting where both the X axis and Y axis are expressed using logarithmic scales, rather than linear scales) follows a straight line. Zipf distributions are commonly observed when plotting object popularity.

In the context of requests for objects, a Zipf distribution is one where the probability $P_X$ of a request being for a certain object "O" is proportional to the value $[1/(X  \alpha)]$, for some value of $\alpha$. In this expression, "X" represents the object's rank and $\alpha$ (alpha) is the Zipf coefficient value. For example, if object O is the fifth most popular object out of a total object population of 1,000, then X=5 and the probability of a given inbound request being for this object is $[1/(5  \alpha)]$. On the other hand, the much-lower probability of a given request being for the least-popular object (having rank X=1,000) is $[1/1,000**\alpha)]$. The value of $\alpha$ will vary for different services, and will typically be between 0.5 and some small number such as 1.1. Services that exhibit a very high locality of reference for the most popular objects have a relatively high $\alpha$ value; on the other hand, services will have a lower $\alpha$ value when the object requests are more evenly distributed across the total object population. Thus, the value of $\alpha$ determines the shape of the Zipf distribution curve for the service.

FIG. 1 illustrates a Zipf-like distribution for 3 different values of $\alpha$, namely 0.7, 0.9, and 1.1. In this graph, the relative popularity of an object has been plotted along the Y axis and the rank of that object (i.e., where the objects falls within the sequence of most-requested objects) has been plotted along the X axis. When the object popularity exhibits a Zipf distribution, as in an average Website, there are typically a few objects which each receive a very large number of requests (such as the home page of popular search engines), a large number of objects which each receive a very small number of requests (such as relatively obscure or unpopular Web pages), and a large number of objects which receive a medium number of requests. (In some cases, the number of "unpopular" objects is less than the number of objects receiving a medium number of requests; in other cases, the number of unpopular objects may be much larger.) The objects receiving the very large number of requests rank highest in relative popularity, and thus have a high popularity value (plotted on the Y axis) and a low object rank (where the most popular object has rank=1, plotted along the X axis). These objects are represented at the upper left of the curves in FIG. 1. The lower right portion of the curves, appearing as a relatively flat "tail", represents the objects having low popularity and therefore a high object rank.

Papers discussing the Zipf-like distribution of content requests in distributed computing environments include "Zipf Curves and Website Popularity", published on the Internet at location http://www.useit.com/alertbox/zipf.html (Apr. 15, 1997) and "Do Websites Have Increasing Returns", Jakob Nielsen, published on the Internet at location http://www.useit.com/alertbox/9704b.html (Apr. 15, 1997).

As stated earlier, cache hit ratios are computed by dividing the number of cache hits for a particular service by the total number of object references for that service. For purposes of programmatically determining memory allocation, an estimated cache hit ratio for a particular service may be used as an alternative to an observed cache hit ratio in order to predict the impact of allocating additional memory to a service's object cache. According to preferred embodiments of the present invention, this estimated cache hit ratio is computed using the total number ("T") of objects in the service's request stream, the size of cache ("M", expressed in terms of objects) allocated to this service, and the $\alpha$ Zipf value for the service's request stream. (The value of T may be determined by analyzing the service's request stream over some time period.)

Given a cache size of M, preferred embodiments assume that the service's "M" most popular objects are stored in cache. That is, a "perfect" cache replacement algorithm is assumed, for ease of analysis. Cache misses will therefore occur only for objects having popularity rank (M+1) to T. Before discussing the formula for estimating cache hit ratios in greater detail, an example cache hit ratio graph will now be described.

Figure 2:
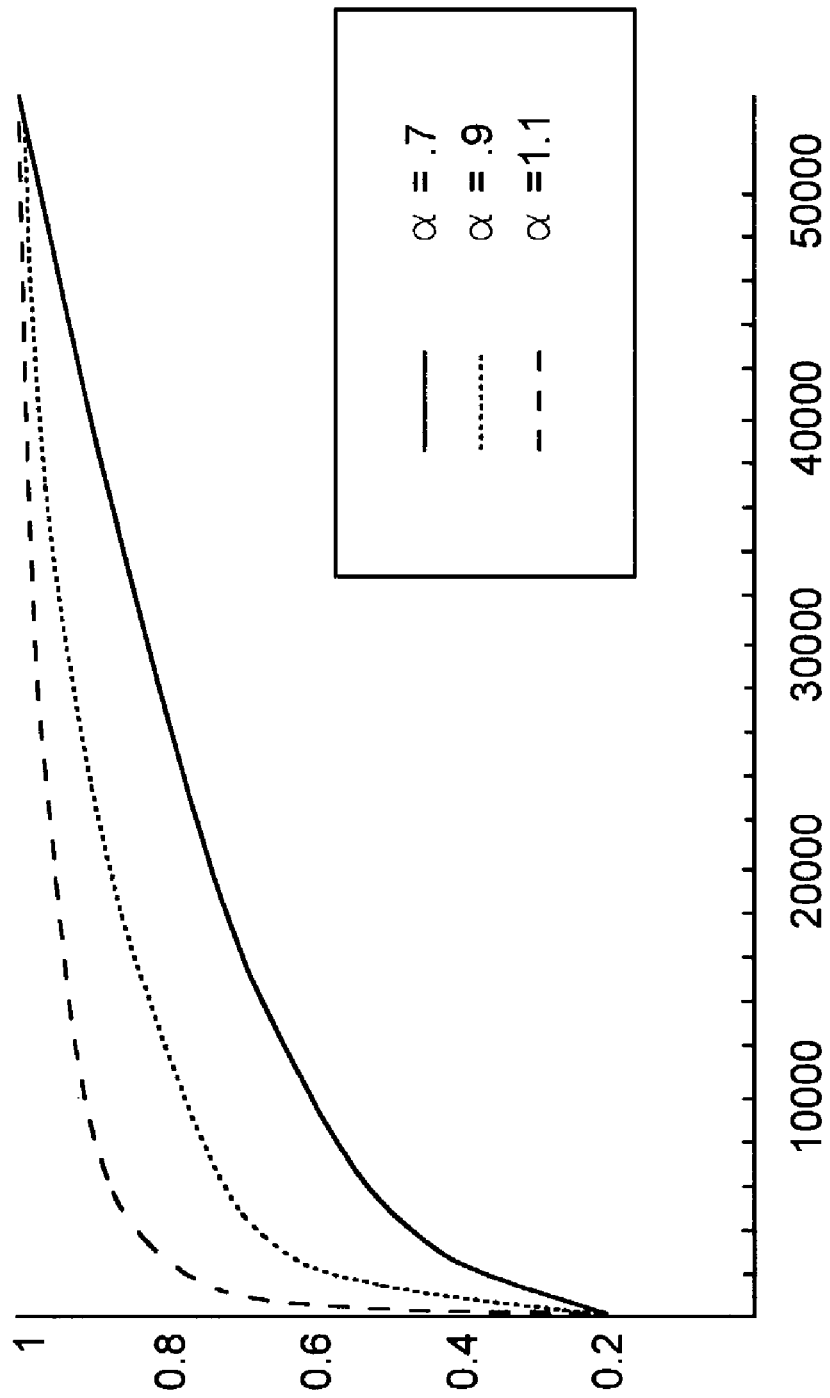
FIG. 2 is a graph of cache hit rates for Zipf-like distributions with varying alpha coefficient values.

FIG. 2 depicts a graph of cache hit rates for Zipf-like distributions with varying alpha coefficient values (where these values correspond to those used when creating the distribution curves in FIG. 1). The Y axis in FIG. 2 plots the cache hit rate, "H", and the X axis plots the size of the object cache (i.e., the number of objects that will fit in the cache—assuming, for ease of analysis, that objects are of uniform size). As shown therein, as the amount of cache allocated to a service increases, the cache hit rate also increases (up to a point). And as discussed earlier, increasing the cache hit rate will decrease the overall client response time because more requests can be served directly from cache.

Referring to FIG. 2, the cache hit ratio estimating algorithm of preferred embodiments is based on dividing the area under the curve up to some point "M" on the X axis by the total area under the curve (representing point "T"), for a given service. This algorithm is shown in FIG. 3A. The algorithm may be reduced to the easily-solvable equivalent closed-form algorithm shown in FIG. 3B. The numerator of this algorithm, $[1-(M(1-\alpha))]$, represents the cache hits, and the denominator, $[1-(T(1-\alpha))]$, represents the total object requests. The resulting value, "H", is the estimated cache hit ratio.

Thus, the estimated cache miss ratio is expressed as $(1-H)$. Multiplying this estimated cache miss ratio by the previously-discussed value "$R_S$" (representing the storage response time) yields the overall average storage response time for a particular service. Adding the average per-request CPU time, "$R_C$", gives the average client response time per request for this service. This equation is shown (in unexpanded form) in FIG. 3C.

The client response time equation shown in FIG. 3C provides the objective function used by preferred embodiments of the present invention to determine which service should receive additional memory allocation. Taking the derivative of this equation, the slope of the line (of client response time) indicates which service will benefit more by the addition of one more object in cache. When comparing services, the one whose derivative function has the largest slope is the one that will benefit more from the added memory. Using this approach, advantageous allocation of memory among competing services can be easily determined.

The objective function disclosed herein may be advantageously used when there is excess (unused) memory to be newly allocated, and/or when deciding whether to deallocate memory from one service and reallocate that memory to another service (for example, when the arrival rate of client requests at that service increases by some configurable threshold). Therefore, references herein to memory allocation are to be considered as including memory reallocation. In the reallocation case, memory is preferably deallocated from the service having the smallest slope in the client response time graph.

Preferably, the memory allocation computations are performed at configurable intervals (such as every 30 seconds).

In an optional aspect, the memory allocation computation also considers response time commitments specified in service level agreements, or "SLAs", for the hosted services. SLAs are commonly used by network service providers to define their contractual service obligations to their customers. One common parameter specified in SLAs is response time commitments, whereby the customer is guaranteed that requests for various types of network-accessible services will be completed within some average elapsed time and/or within some maximum elapsed time. If the service obligations are not met, the customer might be entitled to a reduction in the fees owed to the service provider. Service providers are therefore highly motivated to meet the commitments in their SLAs.

SLAs may express response time commitments using a tiered approach. For example, the terms of an SLA may state that a customer will pay the service provider "X" amount for each client request that is serviced if the average response time falls within a first range, and will pay more than X (for example, a 20 percent premium) if the average response time is reduced to fall within a second (faster) range. More than one such "premium pricing" tier may be defined in a particular SLA.

Thus, when determining how to allocate memory among competing services, the equations described above may be modified to factor in the SLA commitments of the various services. For example, the SLA for service "A" might specify that this customer will pay "Y" amount for a given response time commitment, whereas the SLA for service "B" specifies that this customer will pay Y*2 for the same response time commitment. The service provider may therefore consider its revenue for providing the various response times when deciding which service should receive additional memory; in particular, if more than one service has a nearly-identical slope when evaluating the derivative of the client response time equation, then the service that is committed to paying higher fees for improved response time may be used as the "tie-breaker". A weighting process is preferably used to reflect these differences in the memory allocation process.

As has been demonstrated, the present invention provides advantageous techniques for allocating memory for cache storage among competing services in a distributed computing environment. The disclosed techniques enable maximizing the benefit of memory allocation. Optionally, as has been described, information from SLAs may be used when deciding how to best allocate memory.

The disclosed techniques may also be used to implement improved methods of doing business. For example, Web hosting systems may use the disclosed techniques, to manage memory allocation in an improved manner.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A method of allocating memory among a plurality of competing services in a distributed computing environment, comprising steps of:
    determining an average per-request client response time formula for each particular one of the plurality of competing services;
    computing a derivative of each of the average per-request client response time formulas;
    computing a slope of a line for each computed derivative; and
    allocating additional memory to a selected one of the competing services, wherein the selected one is selected based on the computed slope for that competing service.

2. The method according to claim 1, wherein the step of determining an average per-request client response time formula further comprises the steps of:
- determining an average central processing unit ("CPU") time for processing requests of the particular service;
- determining an average storage response time for the requests of the particular service;
- determining an estimated cache hit ratio for the particular service;
- computing an estimated cache miss ratio for the particular service as (1−the estimated cache hit ratio for the particular service);
- multiplying the estimated cache miss ratio for the particular service by the average storage response time for the particular service, fielding a response time component for the particular service; and
- adding the average CPU time for the particular service and the response time component for the particular service, thereby obtaining the average per-request client response time formula for the particular service.

3. The method according to claim 2, wherein the estimated cache hit ratio is based upon a Zipf-like distribution function of the particular service.

4. The method according to claim 1, further comprising the step of weighting the computed slopes to reflect response time commitments from one or more service level agreements pertaining to the particular service for which that slope was computed.

5. The method according to claim 1, wherein the selected one of the competing services is that one for which the computed slope has a largest value.

6. A system for allocating memory among a plurality of competing services in a distributed computing environment, comprising:
- means for determining an average per-request client response time formula for each particular one of the plurality of competing services;
- means for computing a derivative of each of the average per-request client response time formulas;
- means for computing a slope of a line for each computed derivative; and
- means for allocating additional memory to a selected one of the competing services, wherein the selected one is selected based on the computed slope for that competing service.

7. The system according to claim 6, wherein the means for determining an average per-request client response time formula further comprises:
- means for determining an average central processing unit ("CPU") time for processing requests of the particular service;
- means for determining an average storage response time for the requests of the particular service;
- means for determining an estimated cache hit ratio for the particular service;
- means for computing an estimated cache miss ratio for the particular service as (1−the estimated cache hit ratio for the particular service);
- means for multiplying the estimated cache miss ratio for the particular service by the average storage response time for the particular service, fielding a response time component for the particular service; and
- means for adding the average CPU time for the particular service and the response time component for the particular service, thereby obtaining the average per-request client response time formula for the particular service.

8. The system according to claim 7, wherein the estimated cache hit ratio is based upon a Zipf-like distribution function of the particular service.

9. The system according to claim 6, further comprising means for weighting the computed slopes to reflect response time commitments from one or more service level agreements pertaining to the particular service for which that slope was computed.

10. The system according to claim 6, wherein the selected one of the competing services is that one for which the computed slope has a largest value.

11. A computer program product for allocating memory among a plurality of competing services in a distributed computing environment, the computer program product embodied on one or more computer-readable media and comprising:
- computer-readable program code for determining an average per-request client response time formula for each particular one of the plurality of competing services;
- computer-readable program code for computing a derivative of each of the average per-request client response time formulas;
- computer-readable program code for computing a slope of a line for each computed derivative; and
- computer-readable program code for allocating additional memory to a selected one of the competing services, wherein the selected one is selected based on the computed slope for that competing service.

12. The computer program product according to claim 11, wherein the computer-readable program code for determining an average per-request client response time formula further comprises:
- computer-readable program code for determining an average central processing unit ("CPU") time for processing requests of the particular service;
- computer-readable program code for determining an average storage response time for the requests of the particular service;
- computer-readable program code for determining an estimated cache hit ratio for the particular service;
- computer-readable program code for computing an estimated cache miss ratio for the particular service as (1−the estimated cache hit ratio for the particular service);
- computer-readable program code for multiplying the estimated cache miss ratio for the particular service by the average storage response time for the particular service, yielding a response time component for the particular service; and
- computer-readable program code for adding the average CPU time for the particular service and the response time component for the particular service, thereby obtaining the average per-request client response time formula for the particular service.

13. The computer program product according to claim 12, wherein the estimated cache hit ratio is based upon a Zipf-like distribution function of the particular service.

14. The computer program product according to claim 11, further comprising computer-readable program code for weighting the computed slopes to reflect response time commitments from one or more service level agreements pertaining to the particular service for which that slope was computed.

15. The computer program product according to claim 11, wherein the selected one of the competing services is that one for which the computed slope has a largest value.

16. A method of reallocating memory among a plurality of competing services in distributed computing environment, comprising steps of:
   determining an average per-request client response time formula for each particular one of the plurality of competing services;
   computing a derivative of each of the average per-request client response time formulas;
   computing a slope of a line for each computed derivative;
   selecting a first one of the competing services for allocation of additional memory;
   selecting a second one of the competing services for de-allocation of allocated memory; and
   de-allocating a portion of the allocated memory from the second competing service and reallocating that portion to the first competing service.

17. The method according to claim 16, wherein the step of determining an average per-request client response time formula further comprises the steps of:
   determining an average central processing unit ("CPU") time for processing requests of the particular service;
   determining an average storage response time for the requests of the particular service;
   determining an estimated cache hit ratio for the particular service;
   computing an estimated cache miss ratio for the particular service as (1−the estimated cache hit ratio for the particular service);
   multiplying the estimated cache miss ratio for the particular service by the average storage response time for the particular service, yielding a response time component for the particular service; and
   adding the average CPU time for the particular service and the response time component for the particular service, thereby obtaining the average per-request client response time formula for the particular service.

18. The method according to claim 17, wherein the estimated cache hit ratio is based upon a Zipf-like distribution function of the particular service.

19. The method according to claim 16, further comprising the step of weighting the computed slopes to reflect response time commitments from one or more service level agreements pertaining to the particular service for which that slope was computed.

20. The method according to claim 16, wherein the reallocating is triggered by increase in an arrival rate of client requests to the first competing service.

21. The method according to claim 16, wherein the first competing service is that one of the competing services for which the computed slope has a largest value and the second competing service is that one of the competing services for which the computed slope has smallest value.

22. A system for reallocating memory among a plurality of competing services in a distributed computing environment, comprising:
   means for determining an average per-request client response time formula for each particular one of the plurality of competing services;
   means for computing a derivative of each of the average per-request client response time formulas;
   means for computing a slope of a line for each computed derivative;
   means for selecting a first one of the competing services for allocation of additional memory;
   means for selecting a second one of the competing services for de-allocation of allocated memory; and
   means for de-allocating a portion of the allocated memory from the second competing service and reallocating that portion to the first competing service.

23. The system according to claim 22, wherein the means for determining an average per-request client response time formula further comprises:
   means for determining an average central processing unit ("CPU") time for processing requests of the particular service;
   means for determining an average storage response time for the requests of the particular service;
   means for determining an estimated cache hit ratio for the particular service;
   means for computing an estimated cache miss ratio for the particular service as (1−the estimated cache hit ratio for the particular service);
   means for multiplying the estimated cache miss ratio for the particular service by the average storage response time for the particular service, yielding a response time component for the particular service; and
   means for adding the average CPU time for the particular service and the response time component for the particular service, thereby obtaining the average per-request client response time formula for the particular service.

24. The system according to claim 23, wherein the estimated cache hit ratio is based upon a Zipf-like distribution function of the particular service.

25. The system according to claim 22, further comprising means for weighting the computed slopes to reflect response time commitments from one or more service level agreements pertaining to the particular service for which that slope was computed.

26. The system according to claim 22, wherein the reallocating is triggered by increase in an arrival rate of client requests to the first competing service.

27. A computer program product for reallocating memory among a plurality of competing services in a distributed computing environment, the computer program product embodied on one or more computer-readable media and comprising:
   computer-readable program code for determining an average per-request client response time formula for each particular one of the plurality of competing services;
   computer-readable program code for computing a derivative of each of the average per-request client response time formulas;
   computer-readable program code for computing a slope of a line for each computed derivative;
   computer-readable program code for selecting a first one of the competing services for allocation of additional memory;
   computer-readable program code for selecting a second one of the competing services for de-allocation of allocated memory; and
   computer-readable program code for de-allocating a portion of the allocated memory from the second competing service and reallocating that portion to the first competing service.

28. The computer program product according to claim 27, wherein the computer-readable program code for determining an average per-request client response time formula further comprises:
   computer-readable program code for determining an average central processing unit ("CPU") time for processing requests of the particular service;

computer-readable program code for determining an average storage response time for the requests of the particular service;

computer-readable program code for determining an estimated cache hit ratio for the particular service;

computer-readable program code for computing an estimated cache miss ratio for the particular service as (1−the estimated cache hit ratio for the particular service);

computer-readable program code for multiplying the estimated cache miss ratio for the particular service by the average storage response time for the particular service, fielding a response time component for the particular service; and computer-readable program code for adding the average CPU time for the particular service and the response time component for the particular service, thereby obtaining the average per-request client response time formula for the particular service.

29. The computer program product according to claim 28, wherein the estimated cache hit ratio is based upon a Zipf-like distribution function of the particular service.

30. The computer program product according to claim 27, further comprising computer-readable program code for weighting the computed slopes to reflect response time commitments from one or more service level agreements pertaining to the particular service for which that slope was computed.

31. The computer program product according to claim 27, wherein the first competing service is that one of the competing services for which the computed slope has a largest value and the second competing service is that one of the competing services for which the computed slope has a smallest value.

32. A method of doing business by allocating memory among competing services in a distributed computing environment, comprising steps of:

determining an average per-request client response time formula for each particular one of the plurality of competing services;

computing a derivative of each of the average per-request client response time formulas;

computing a slope of a line for each computed derivative;

when additional memory is to be allocated, performing the step of:

allocating additional memory to a selected one of the competing services, wherein the selected one is selected based on the computed slope for that competing service; and when allocated memory is to be reallocated, performing the steps of:

selecting a first of the competing services for allocation of additional memory;

selecting a second of the competing services for de-allocation of allocated memory; and de-allocating a portion of the allocated memory from the second competing service and reallocating that portion to the first competing service.

33. The method according to claim 32, wherein the step of determining an average per-request client response time formula further comprises the steps of:

determining an average central processing unit ("CPU") time for processing requests of the particular service;

determining an average storage response time for the requests of the particular service;

determining an estimated cache hit ratio for the particular service;

computing an estimated cache miss ratio for the particular service as (1−the estimated cache hit ratio for the particular service);

multiplying the estimated cache miss ratio for the particular service by the average storage response time for the particular service, fielding a response time component for the particular service; and adding the average CPU time for the particular service and the response time component for the particular service, thereby obtaining the average per-request client response time formula for the particular service.

* * * * *